United States Patent [19]
Follis

[11] Patent Number: 5,237,634
[45] Date of Patent: Aug. 17, 1993

[54] FIBER LASER LIGHT PROJECTION SYSTEM

[76] Inventor: Charles R. Follis, 1025 Schiele Ave., San Jose, Calif. 95126

[21] Appl. No.: 817,168

[22] Filed: Jan. 6, 1992

[51] Int. Cl.$^5$ .............................................. G02B 6/00
[52] U.S. Cl. .......................................... 385/31; 372/6
[58] Field of Search ............................... 372/6; 385/31

[56] References Cited

U.S. PATENT DOCUMENTS

| | | | |
|---|---|---|---|
| 3,803,398 | 4/1974 | Walker | 240/10 L |
| 3,904,866 | 9/1975 | Hayes | 240/10 L |
| 4,011,403 | 3/1977 | Epstein et al. | 362/32 |
| 4,280,122 | 7/1981 | McKinley et al. | 340/38 U |
| 4,381,882 | 5/1983 | Sabine | 385/31 X |
| 4,519,017 | 5/1985 | Daniel . | |
| 4,544,232 | 10/1985 | Laude | 385/31 X |
| 4,561,043 | 12/1985 | Thompson | 362/32 |
| 4,715,700 | 12/1987 | Daniel | 385/31 |
| 4,860,172 | 8/1989 | Schlager et al. | 362/32 |
| 4,904,035 | 2/1990 | Heckmann et al. | 385/31 |
| 5,021,928 | 6/1991 | Daniel | 385/31 X |

*Primary Examiner*—Akm E. Ullah
*Attorney, Agent, or Firm*—Townsend and Townsend Khourie and Crew

[57] ABSTRACT

A single fiber laser light projection system consists of 3 primary elements: (1) a secured fiber capable of generating specular reflections of laser light; (2) a laser beam whose beam diameter exceeds the cross-sectional diameter of said fiber; and (3) an intersection between the fiber and the laser beam at any angle through 90 degrees. Any angle of intersection less than 90 degrees will generate a cone of laser light. The directional tangent of the fiber at the point of intersection will define the cone's vortex, while the laser light will be distributed along the cone's perimeter. When the angle of intersection between the laser beam and the fiber is 90 degrees, a plane of laser light will be projected. A plurality of reflective fibers can be secured to a support structure for use with an incident laser beam. These multiple fibers can be arranged in an orderly fashion for aesthetic purposes, and to support ornamental items such as crystals. A laser beam can be directed into this multiple fiber projection system under the direction of an electromechanical mirrored scanner. Single and multiple fiber laser light projection systems can be used to resolve industrial, educational, military, and aesthetic laser scanning matters in an efficient, economical, and reliable manner.

20 Claims, 14 Drawing Sheets

FIBER LASER LIGHT PROJECTION SYSTEM

BACKGROUND OF THE INVENTION

This invention relates to the redistribution of laser beam photons into desired geometric projection patterns, specifically conic and linear laser light projection patterns, for industrial, educational, commercial, and aesthetic applications.

Heretofore, laser light projection patterns have been generated by a method known as laser scanning. Laser scanning involves reflecting an incident laser beam off an electromechanically controlled mirror whose position changes with time. The mirror can be controlled to reflect the beam into a laser light pattern to suit the particular application. Scanning laser beams often work in conjunction with laser photodetectors. The presence or absence of the laser beam at the photodetector may be used to trigger some type of process decision making.

Scanning mirrors are put into motion one of two ways. Mirrors can be rotated, or they can be translated backwards and forwards. There exists a variety of electromechanical means capable of rotating or translating a mirror to give the desired laser pattern. Rotating mirrors are typically connected to an electrical motor. A laser light beam is directed at the rotating mirror. As the mirror's position changes with time, so too does the angle at which the beam strikes the mirror. The laser light projection pattern can be controlled by varying the motor's rotational speed, changing the shape of the mirror, or adding other optical elements.

In engineering practice, electrical motors with attached front surface mirrors are typically employed to create laser scanning projection patterns. These motors can vary in sophistication, depending upon the needs of the laser projection application. Free running AC or DC motors, with passive electrical regulation controls, may be all the hardware required to generate the necessary laser pattern. More sophisticated stepper motors, with precise incremental steps of two degrees or less, may be better suited for more demanding laser projection pattern requirements. Stepper motors with attached mirrors require additional drive electronics support hardware, adding significantly to the costs of generating laser patterns.

A special type of rotary servo motor known as a galvanometer is often employed to create laser projection or scan patterns A galvanometer scanner consists of a limited rotary servo motor that is specifically designed for highly linear torque requirements, along with an attached mirror mounted to the motor. Galvanometer scanners can be designed with moving iron or moving coil elements, to which the front surface mirrors are attached. Certain galvanometer arrangements provide for translational backwards and forwards movement of their front surface mirrors. To obtain more complex laser light patterns, the above described motors can be programmed to generate raster or vector patterns. The desired laser light scanning projection pattern ultimately results from precisely controlling the current flowing through the coil of the chosen electromechanical system at any given moment in time. Laser scanning systems employing motors or galvo's are utilized in industry to resolve a variety of applications. Some of these applications include: bar code identification, vision systems, beam positioning systems, facsimile transmission, optical pointing, alignment and measurement systems, robotic positioning control, security systems, sales promotional, educational, and audio-visual aesthetic effects.

All laser scanning implementation methods for generating laser light projection patterns have common inherent problems. The primary problems with traditional electromechanical laser scanning include the following:

A) Laser scanning involves moving parts. Moving parts pose significant reliability risks. Moving parts are given a MTBF, or mean time between failure rating. As such, the mechanical support for the reflecting mirror is expected to fail over time.

B) Laser scanning systems require the use of precision optics. Front surface mirrors with special protective coatings are required. Special polygon mirrors designs are manufactured to demanding tolerances for implementation in many laser scanning systems. Precision positioning is another requirement for these precision optical subcomponents.

C) Laser scanning systems require large minimum package size. In addition to the laser and the mirror, a variety of support electronics and optics are employed to create the desired laser light projection pattern.

D) Laser scanning systems have undesirable minimum power requirements. The support electronics to position the mirror(s) often requires more power than the scan system's laser beam. Power consumption creates its own heat dissipation problems, resulting in added design time and manufacturing costs.

E) Laser scanning systems create noise while creating the desired laser light pattern. Noise is inherit with the above stated moving parts required to position the scanning mirrors.

F) Laser scanning systems are expensive to design, build, and maintain. A typical electromechanical laser scanning system uses custom parts. These custom parts must be stocked as spare items, adding significant administrative costs to the overall system.

SUMMARY OF THE INVENTION

The present invention provides single and multiple fiber laser light projection systems for generating conic and linear laser light patterns. The fiber laser projection systems are simpler, more reliable, and more cost effective than traditional electromechanical laser scanning projection systems.

A single-fiber embodiment, for use in combination with a laser, comprises a cylindrical fiber having an exterior surface capable of generating specular reflections of incident light from the laser. The fiber is supported, preferably in a taut manner.

A multiple-fiber embodiment includes a plurality of fibers held in a three-dimensional support structure. The fibers are in a sparse arrangement, by which is meant that while the fibers extend over a particular volume, they actually occupy a small fraction of the volume. This means that a viewer can see through the volume and a laser beam passing through the volume is unlikely to directly encounter more than one fiber. Note that a beam that strikes a fiber and is defocused will likely encounter other fibers.

The advantages of the invention relate primarily to efficacy and efficiency. Inexpensive commercial fibers are used to redirect laser photons, as opposed to expensive precision optical components, and no moving parts are required to generate conic or linear laser light patterns. The fiber laser light projection system requires significantly less volume than the large subcomponents that are utilized in electromechanical laser scanning implementations. The fiber laser light projection system does not require power to redirect laser photons. As such, fiber laser projection systems do not have the heat dissipation issues designed around in many current laser scanning systems. The fiber laser light projection system does not generate any noise when redirecting laser light photons in conic or linear laser light projection patterns. The fiber laser light projection system requires fewer parts than the electromechanical laser scanning systems. In addition to less parts, the fiber projection employs simpler, non custom, commercially readily available parts. Simpler, less numerous parts results in easier maintainability, and overall system cost.

A further understanding of the nature and advantages of the present invention may be realized by reference to the remaining portions of the specification and the drawings.

BRIEF DESCRIPTION OF THE DRAWINGS

In these drawings, closely related subjects and figures have the same number but different alphabetic suffixes.

REFERENCE NUMERALS IN THE DRAWINGS

6—Y axis
8—Z axis
10—X axis
12—translucent fiber
12D—translucent fiber diameter
13—reflective fiber
13A—reflective fiber directional tangent
14—laser beam
14D—laser beam diameter
16—laser
18—point of intersection
18*—angle of intersection
18#—projection screen tilt angle
18R—angle of refraction
19A1 through A6—reflected laser photons
19B1 through B6—refracted laser photons
19C1 through C6—diffracted laser photons
20A, 20B—single fiber lockdown means
21—expanding plane of laser light
22—nonreflective screen
22R,L—rightmost and leftmost horizontal laser projection points
24C—circle laser pattern
24E—elliptical laser pattern
30—fishline knot
39A,B—circular panel cutouts
40A,B—horizontal panels
41A,B—vertical panels
42—structural beam
43—circular casing, clear
45A,B—circular horizontal panel
46A,B—suspended circular planes
48A,B,C—tangential laser circles
49A,B—fiber to case lockdown means
50A,B—vertical case fibers
52A,B—horizontal case reflective fibers
54A,B—cone case fibers
55—crystal
60—electromechanical mirrored scanner
68—yz plane
90—90 degree angle

DETAILED DESCRIPTION OF THE PREFERRED EMBODIMENTS

Figure 1A:
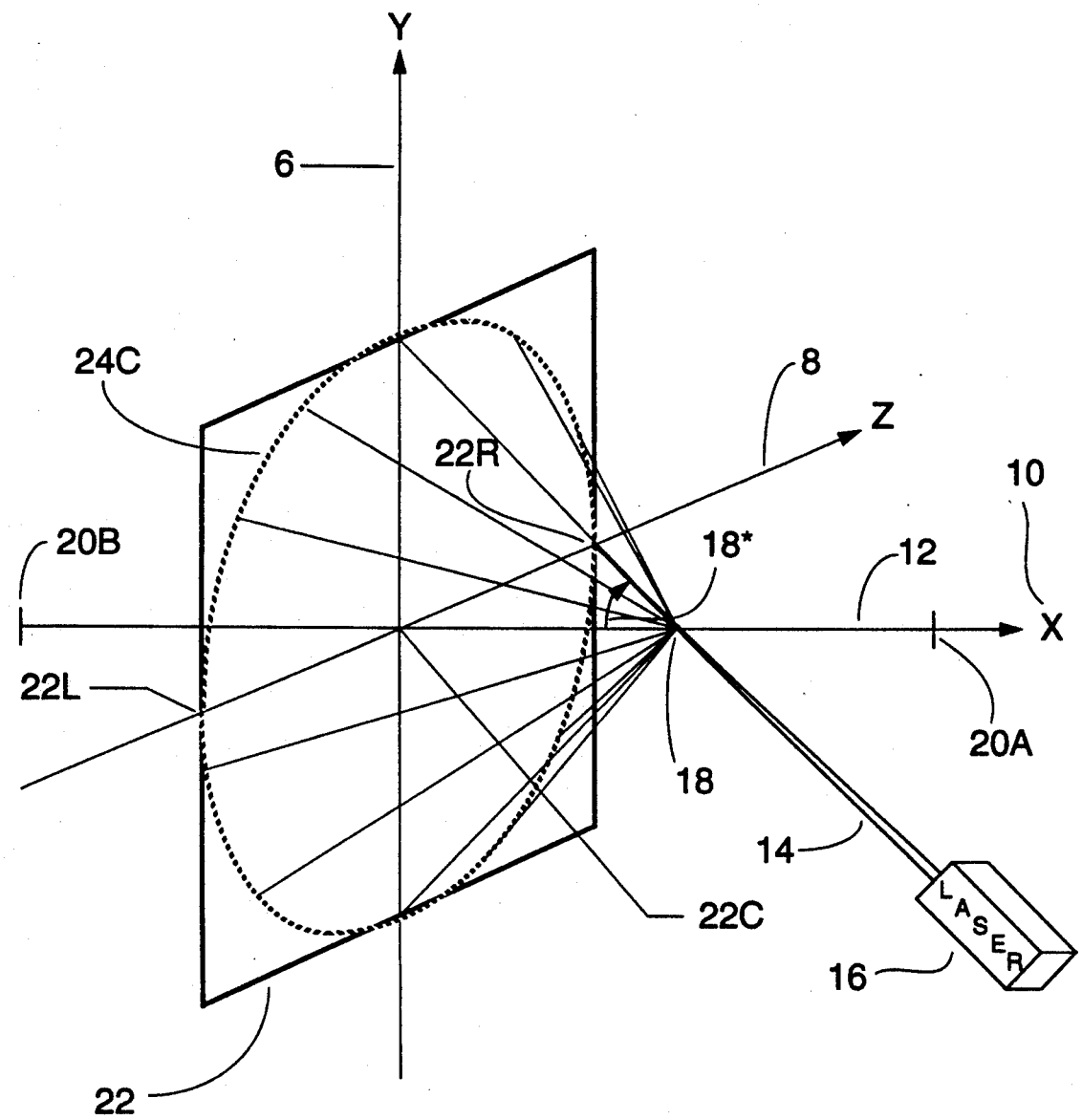
FIG. 1A is a perspective view of a laser beam intersecting a translucent fiber at a 45 degree angle.

FIG. 1A demonstrates a laser beam 14 intersecting a translucent fiber 12 at an angle 18*. Angle 18* in this figure has been drawn to 45 degrees. For ease of explanation, the cylindrically shaped translucent fiber 12 has been placed to be incident with the x axis 10. The fiber 12 shown in FIGS. 1A through 1E is held in a taut manner through fiber lockdown means 20A and 20B. It is important to note fiber 12 is capable of generating sharp, specular mirror-like partial reflections of laser light, as opposed to dull, diffuse type reflections. The intersection between the tautly held fiber 12 and the laser beam 14 occurs at the point of intersection 18.

The individual laser photons that collectively make up the laser beam 14 are redirected upon striking the fiber 12. FIG. 1A shows a nonreflective screen 22 incident within the plane formed by the y axis 6 and the z axis 8. These individually directed laser photons strike the nonreflective screen 22, forming a circular pattern 24C. Alternating dark-to-light laser light intensity patterns can be observed in circular pattern 24C. These intensity patterns in 24C are the result of a diffraction effect characteristic of the intersection of a laser beam 14 with a translucent type fiber 12 shown in FIG. 1A.

It can be observed in FIG. 1A that the intersecting laser beam 14 and the fiber 12 will project a cone of laser light. The fiber 12 acts as the cones vortex or center pole, and the individual laser photons make up the cones perimeter. Circular pattern 24C results from to chosen orientation of the x axis 10 and its coincident fiber 12 as compared to the nonreflective screen 22, which resides in the yz plane. Following standard Cartesian orientation, the yz plane is by definition perpendicular to the x axis. As such, the laser cone formed by the intersecting laser beam 14 and the x axis aligned translucent fiber is a right angle cone. The circular laser pattern 24C projected on the nonreflective screen 22 acts as the base of this laser light cone.

Figure 1B:
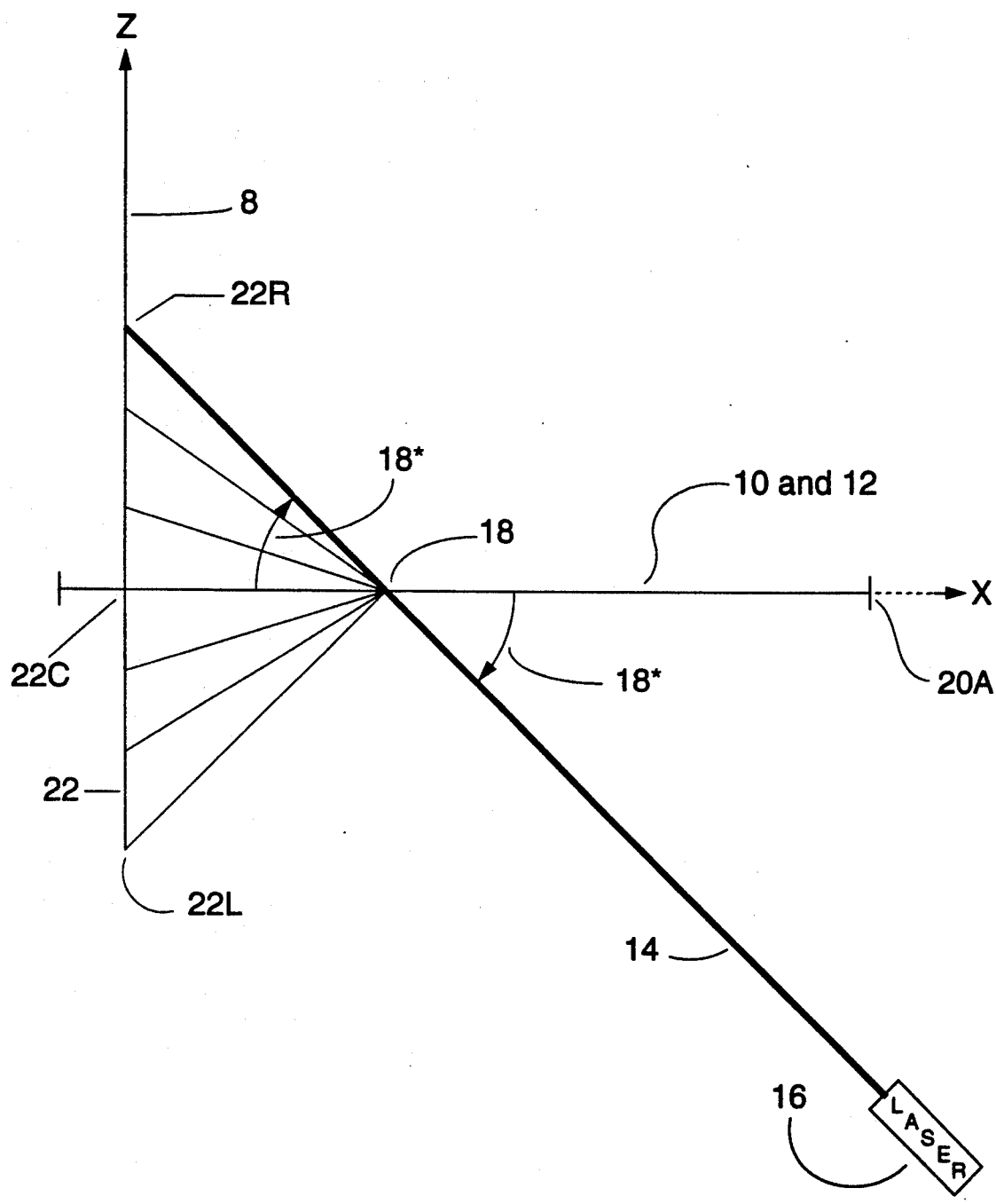
FIG. 1B is a top view of the 45 degree laser-to-fiber intersection.

FIG. 1B is a top view of the 45 degree angle of intersection 18* that is formed between the laser beam 14 and the fiber 12. This top view clearly indicates the direct relationship between the angle of intersection 18* and the angle of the right angle cone, also 18*.

This top view looks down upon the xz plane, making the nonreflective screen 22 discussed in FIG. 1A appear as a line in FIG. 1B. Points 22R and 22L represent the furthest most laser light points resident in the xz plane. The significance of point 22R is that it typically exhibits the greatest brightness or intensity. Unlike point 22L and virtually all the remaining points in circular pattern 24C, point 22R results from a greater degree of transmission of laser light through the translucent fiber 12. In practice, point 22R will be slightly offset from the laser beam path 14. This offset is the result of refraction effects, discussed in FIG. 1D.

From the top view vantage of FIG. 1B, a two dimensional triangle of laser light appears. Leftmost laser light projection point 22L, rightmost point 22R, and the point of beam-to-fiber intersection 18 combine to form the 3 points of this triangle. The triangle's perimeter is filled with visible laser light can be made more observable in the presence of a light scattering means such as smoke.

Figure 1C:
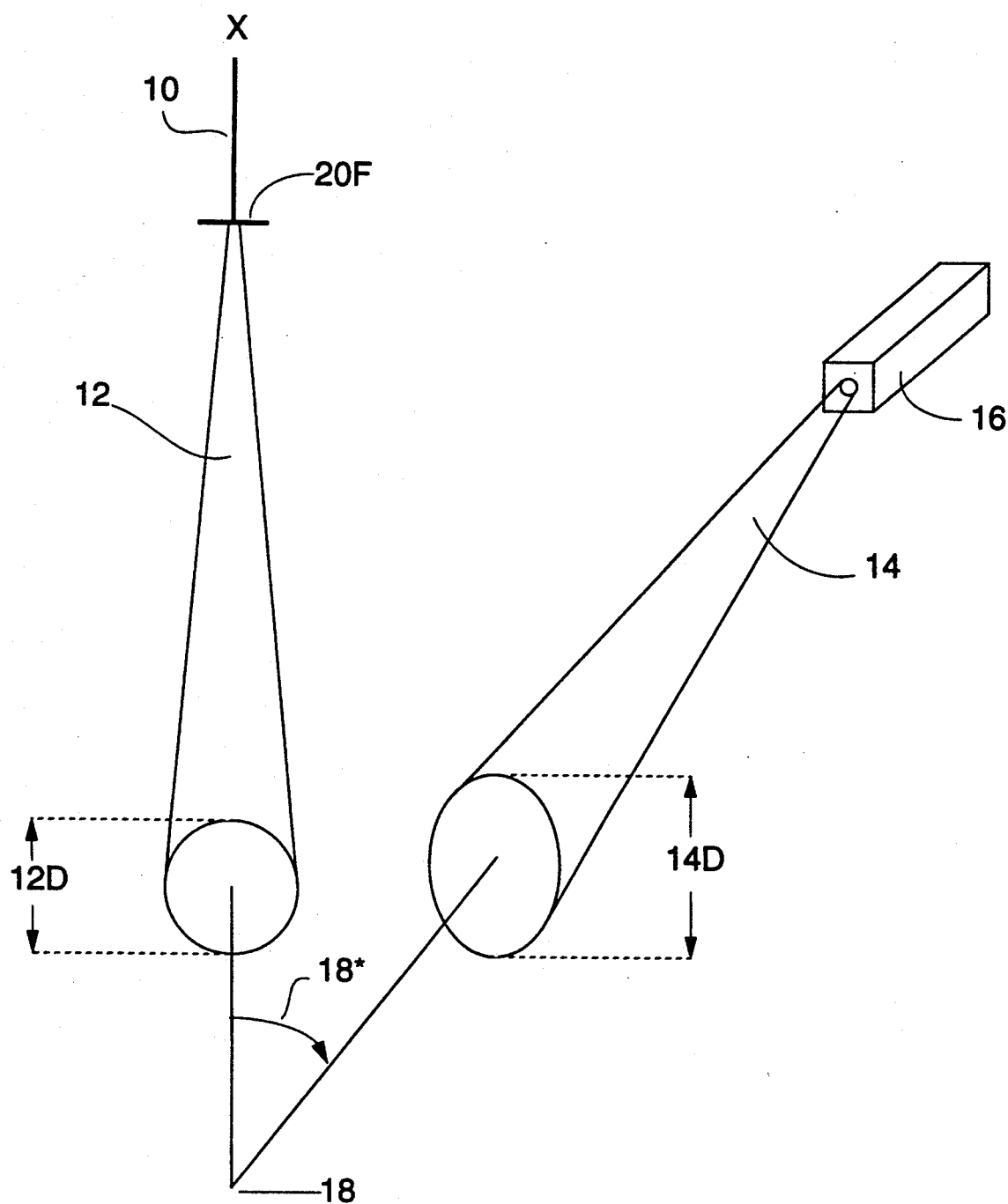
FIG. 1C is a perspective view of the laser-to-fiber intersection, just before the intersection is about to occur. The size relationship between the larger beam and smaller fiber is shown.

FIG. 1C is a combinational perspective-cross-sectional view of an impeding intersection between the laser beam 14 and the fiber 12. This view demonstrates a key relationship that needs to occur in order to generate the three dimensional cone observed in FIG. 1A. Namely, FIG. 1C indicates that laser beam diameter 14D exceeds the fiber 12 cross-sectional diameter 12D at the point of intersection 18. The laser beam diameter 14D shall be defined as the cross-sectional area containing 86% of the laser output at any specified length within the beam's projection path.

Figure 1D:
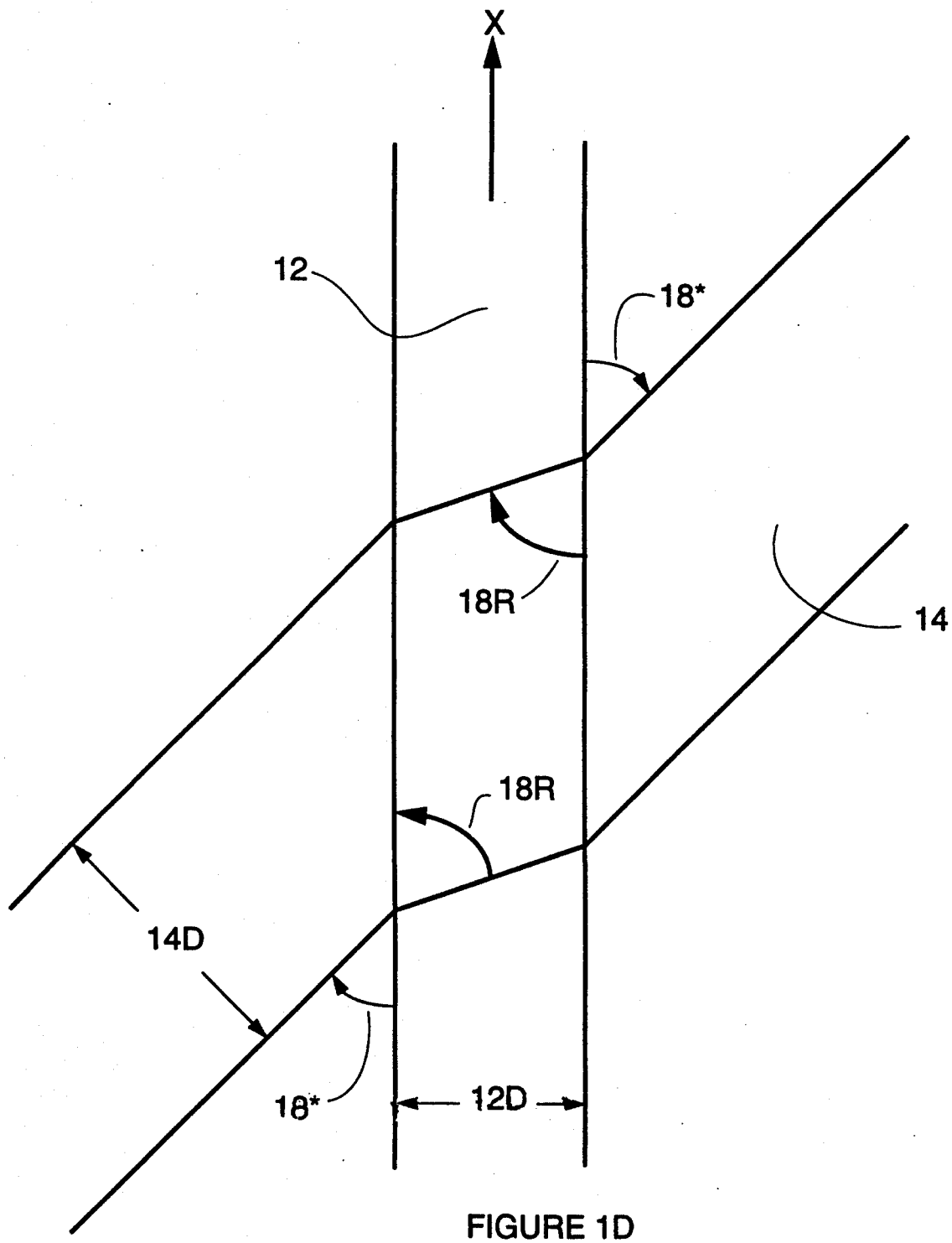
FIG. 1D is a top view of the laser beam intersecting the fiber at 45 degrees. The bending of the refracted laser beam through the translucent fiber is demonstrated.

FIG. 1D represents a top view directly over the intersection of the laser beam 14 and the fiber 12. The view 15 has been enlarged to better illustrate the bending of laser light 14 through the translucent fiber 12. Only light transmitted through the fiber is drawn in this figure, with reflected and diffracted laser light omitted from this drawing.

Laser light is redirected at an angle of refraction 18R upon entering and exiting the fiber 12. Angle 18R acts as the angle of refraction. This angle of refraction 18R is a physical function between the angle of intersection 18* and the optical characteristics of the translucent fiber 12. This refraction angle can be readily determined mathematically given the fibers index of refraction angle, and by measuring the angle of intersection between the translucent fiber 12 and the laser beam 14.

Laser beam 14, upon exiting the translucent fiber 12, will be offset slightly from its original path. This slight directional offset results from the bending or refraction of light which occurred within fiber 12. The new offset path for laser beam 14 is typically not noticed by the casual observer, but may be critical in certain engineering applications.

Figure 1E:
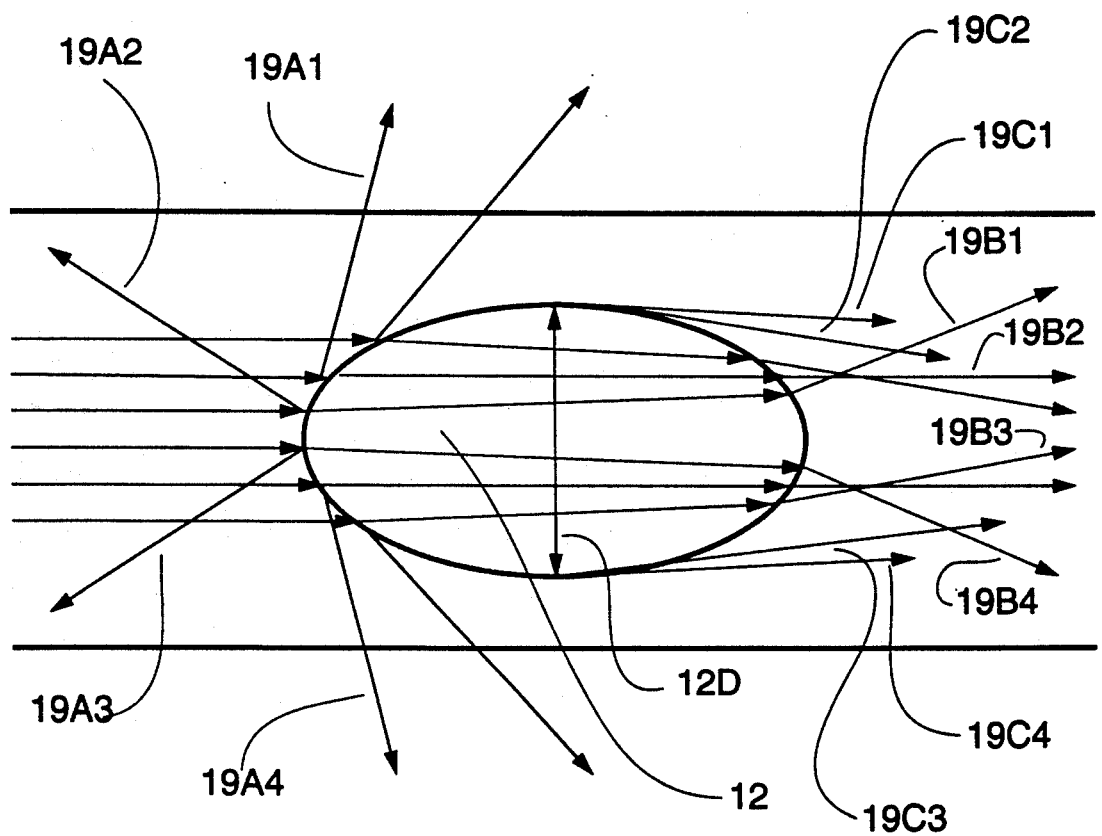
FIG. 1E is a 45 degree cross-section view of the fiber, with the laser beam intersecting it. Laser beam photons are reflected off refracted through, and diffracted around the translucent fiber.

FIG. 1D is drawn to show the path of the transmitted laser beam 14 through the translucent fiber 12. There are other physical effects that take place between the laser 14 and the fiber 12. In addition to the bending of laser light, also known as refraction, individual laser light photons are reflected off the fiber 12, and diffracted around fiber 12. FIG. 1E goes into more detail on these equally important optical phenomena.

FIG. 1E is a 45 degree cross-sectional view looking into the translucent fiber 12. The laser beam 14, with it's larger overall diameter 14D, consists of individual photons. These photons will refract through, reflect off, or diffract around the translucent fiber 12. Reflected laser photons 19A1-19A6, Refracted laser photons 19B1-19B6, and diffracted photons 19C1-19C6 are all indicated in FIG. 1E. In actual practice, and intersection between a laser 14 and a smaller diameter translucent fiber will consist of countless redirected laser photons. Collectively these photons will form the outline of a cone, as shown in FIG. 1A.

Figure 2A:
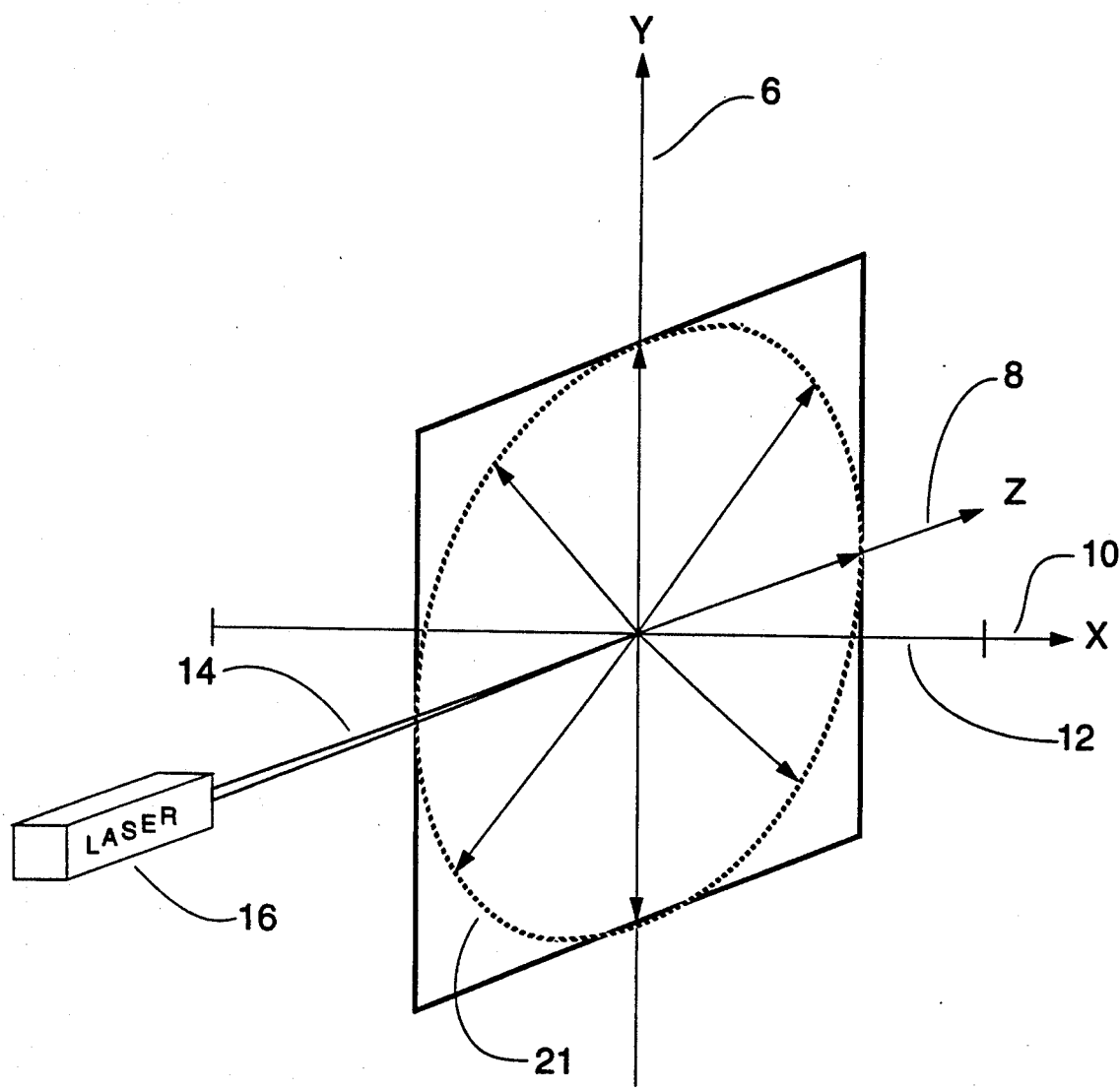
FIG. 2A is a perspective view of the laser beam intersecting a translucent fiber at 90 degrees. An outward expanding plane of laser light results, with diffraction patterns resulting from the intersection between the laser and the translucent fiber.

FIG. 2A shows a laser beam 14 intersecting a translucent fiber 12 at 90 degrees. Laser photons are once again redirected at the point of intersection 18. Photons are reflected off, refracted through, and diffracted around the translucent fiber 12. A plane of laser light 21 will expand outward from the point of intersection 18.

This plane of laser light 21 is illustrated in the yz plane of FIG. 2A. Alternating light and dark sections of laser light can be observed in the laser light plane 21. These patterns are the diffraction pattern resultant from the intersection of the laser beam 14 and the translucent fiber 12. These light-to-dark laser light diffraction will change and increase in size as a function of the distance from the point of intersection 18.

In FIG. 2A, the expanding plane of laser light is drawn as though it was frozen in time. The plane of laser light 21 will continually expand outward at the speed of light until it is stopped or redirected by some physical surface.

Figure 2B:
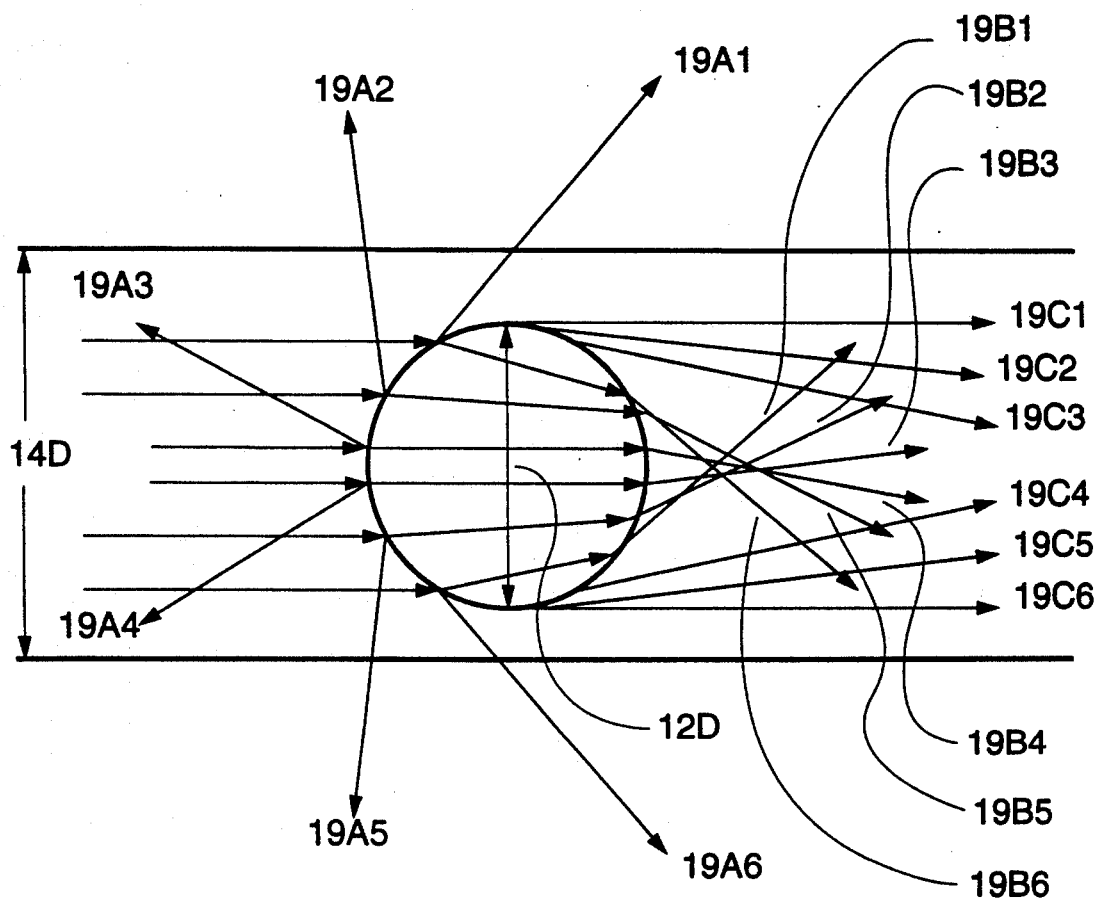
FIG. 2B shows an enlarged cross-sectional view of the laser beam intersecting the translucent fiber at 90 degrees. Individual laser beam photons are reflected, refracted, and diffracted around the translucent fiber.

FIG. 2B is an enlarged fiber cross-sectional view of the 90 degree intersection between the translucent fiber 12 and the laser beam 14. This view illustrates the key relationship between the laser beam diameter 14D and the translucent fiber diameter 12D. The laser diameter must exceed the fibers diameter to create the plane of laser light at the point of intersection indicated in FIG. 2B.

The translucent nature of fiber 12 shown in FIG. 2B results in 3 possible paths in which incident laser photons can be directed. Laser photons 19A1-19A6 are reflected off the translucent fiber 12. Laser photons 19B1-19B6 are refracted through the translucent fiber 12. Laser photons 19C1-19C6 are diffracted around the translucent fiber 12. All the photons remain in the yz plane defined by the y axis 6 and the z axis 8, both of which are shown in FIG. 2A.

Figure 3A:
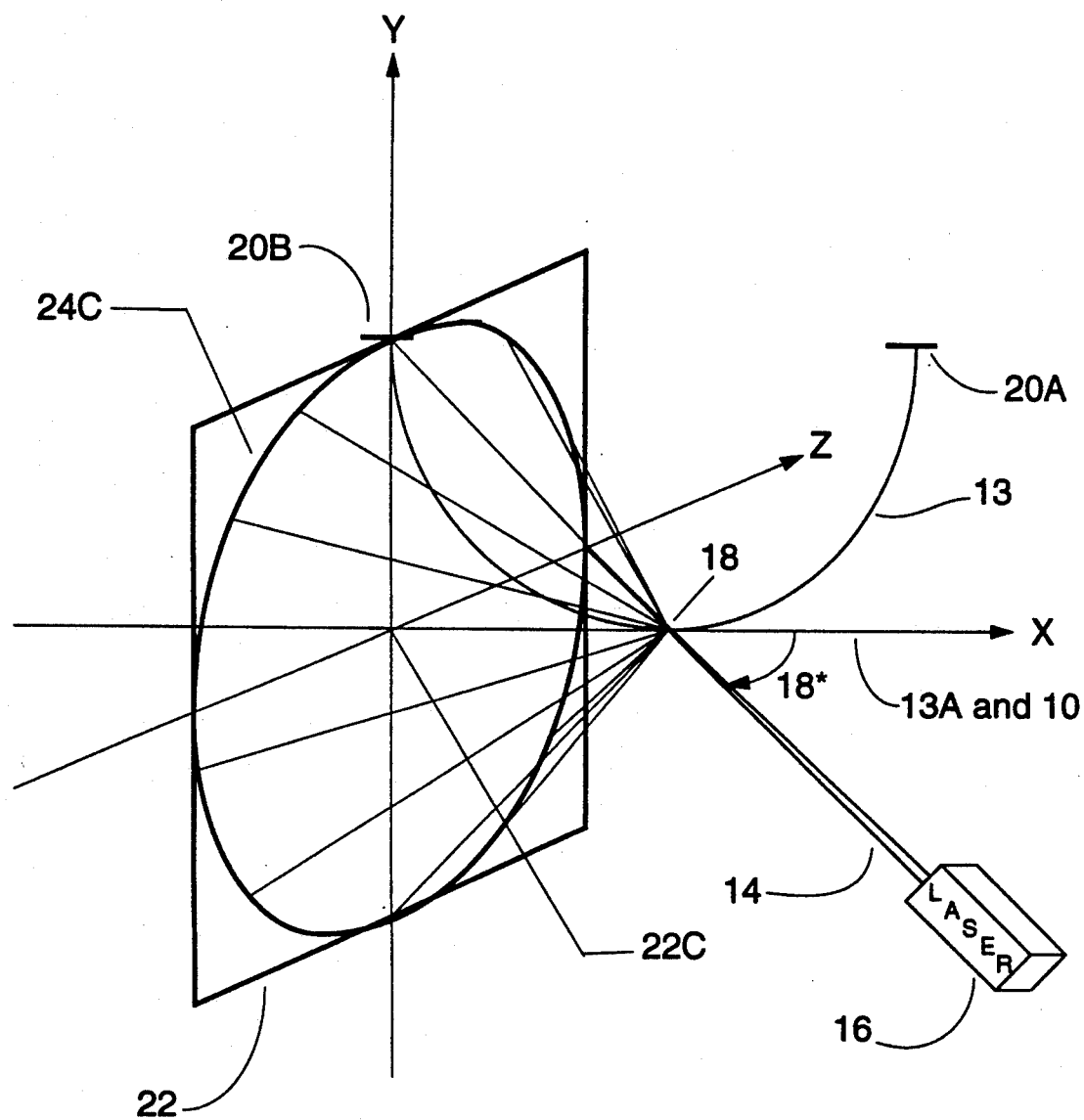
FIG. 3A shows a laser beam intersecting a nontautly positioned reflective fiber. A right angle cone is projected out against a perpendicularly positioned nonreflective screen.

FIG. 3A represents a perspective view of a laser beam 14 intersecting a nontautly positioned reflective fiber 13. The point of intersection 18 shall act as the origin of a fiber directional tangent 13A. The fiber directional tangent shall be defined as the direction of the fiber at the point of intersection with the laser 14. The fiber directional tangent shall act as the vortex or center pole of a right angle cone formed by the intersecting laser 14 and fiber 13.

The angle of intersection between the laser 14 and the directional fiber tangent 13A shall define a right angle cone. This cone expands outward in space until it strikes the nonreflective screen 22 indicated in FIG. 3A. The nonreflective screen 22 is positioned perpendicularly to the directional tangent 13A. A circular laser pattern is observed on the nonreflective screen 22.

FIG. 3A utilizes a reflective fiber, as opposed to the translucent fibers discussed in FIGS. 1A-1E and 2A-2B. As such, laser photons are simply reflected off fiber 13, and redirected onto the nonreflective screen 22. The reflective fiber 13 will create a solid circular laser pattern 24C indicated in FIG. 3A. This solid circular laser light pattern differs fundamentally from the alternating light and dark patterns resulting form a translucent fiber utilized in FIGS. 1 and 2. The circular pattern shown in FIG. 3A is a results primarily from laser photon reflection effects. Laser photons can not refract through a reflective fiber.

Figure 3B:
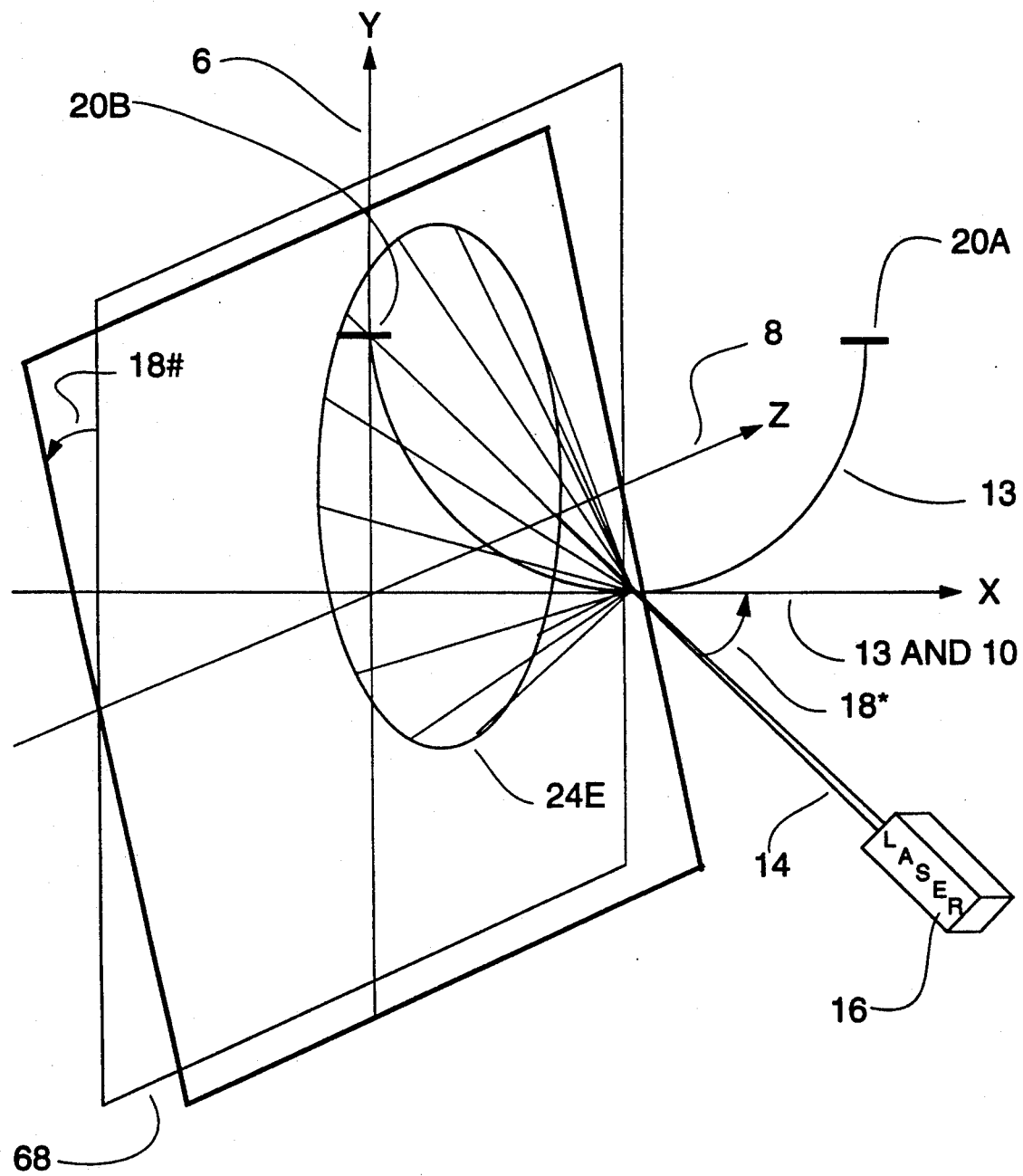
FIG. 3B shows a laser beam intersecting a nontautly positioned reflective fiber. An elliptically shaped laser light pattern is projected onto the screen, resulting from a angled screen offset.

FIG. 3B is a perspective drawing illustrating the effect on the laser light projection pattern by tilting the projection screen. The intersection described by the laser beam 14 and the reflective fiber 13 in FIG. 3A holds true with one exception; in FIG. 3B, the nonreflective projection screen is rotated at an angle 18# away from the yz plane 68. The nonreflective screen 22 is no longer perpendicular to the fiber directional tangent 13A.

As such, the circular laser light pattern previously discussed in FIG. 3A is projected as an ellipse laser light pattern 24E on the tilted projector screen 22. The shape or eccentricity of the elliptical pattern will depend on the projection screen tilt angle 18#: the greater the tilt, the more exaggerated the shape of the elliptical laser light pattern 24E will become.

Figure 3C:
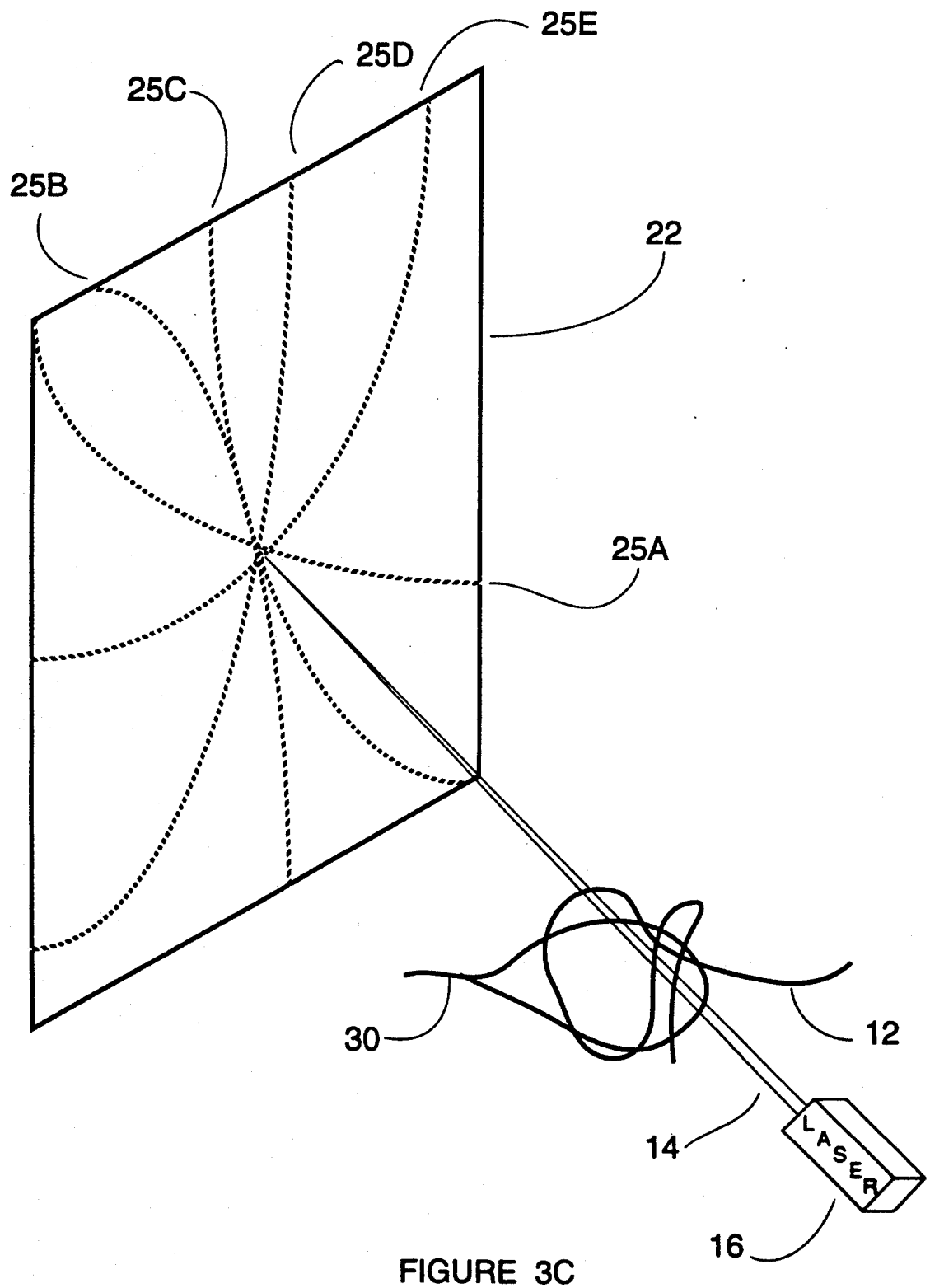
FIG. 3C is a perspective drawing of a laser beam intersecting a fishline knot. Five separate curves are projected onto the screen, each curve resulting from a unique intersection between the laser and the translucent fishline.

FIG. 3C illustrates a laser striking a fishknot consisting of translucent fiber 12, perhaps made of fishline. The laser 14 is positioned such that it intersects the translucent fishline knot 30 at 5 separate locations.

In FIG. 3C, neither the fiber 12 or its directional tangents are at 90 degree angles to the nonreflective screen 22. The 5 wide diameter laser light patterns 25A through 25E projected onto the nonreflective screen 22 appear to be complex curving laser light patterns. In actuality, all 5 patterns are simple right angle cone patterns. All 5 wide diameter laser light patterns 25A through 25E which are projected onto the nonreflective screen 22 have their own unique xyz orientations. These 5 complex appearing projection patterns indicated in FIG. 3C can be reduced to simple right cone projection patterns, provided enough information on intersection position and intersection angle. The alternating light-to-dark laser light patterns observed in patterns 25A-25E result from the cumulative effects of diffraction, reflection, and refraction through the translucent fishknot 30.

Figure 4A:
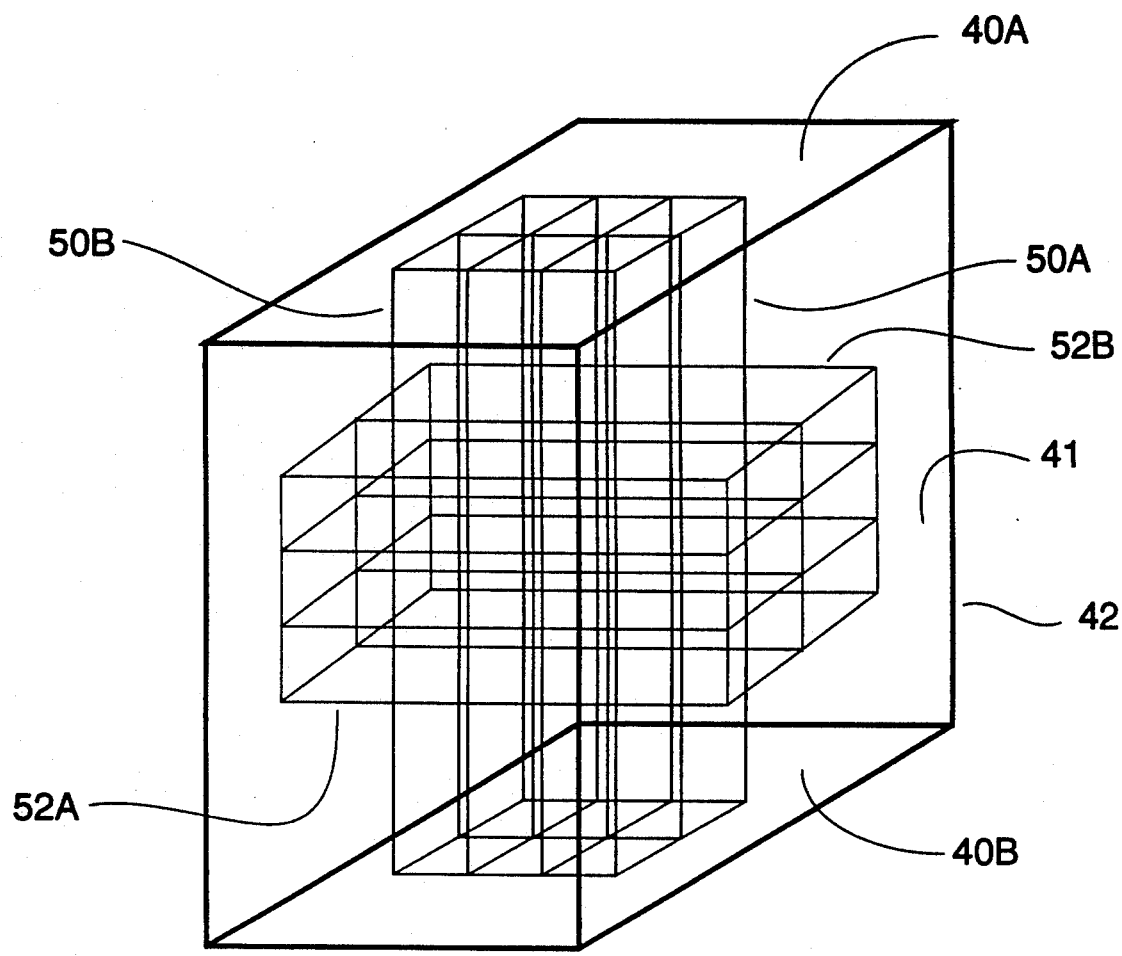
FIG. 4A is a perspective drawing of multiple fiber laser light projection system. The fiber pattern is strung in an open air three dimensional grid pattern.

FIG. 4A is a perspective drawing of a multiple fiber laser projection system. Four structural beams are utilized in this example, such as structural beam 42. These structural beams support horizontal panels 40A and 40B, as well as vertical panels 41A and 41B. The particular support structure shown in FIG. 4A is only partially enclosed. A horizontal fiber 52A and a vertical fiber 50A are shown in FIG. 4A, while a number of other fibers can be observed. At least 2 of these fibers must be capable of specularly reflecting laser light which could be directed into the projection system.

Figure 4B:
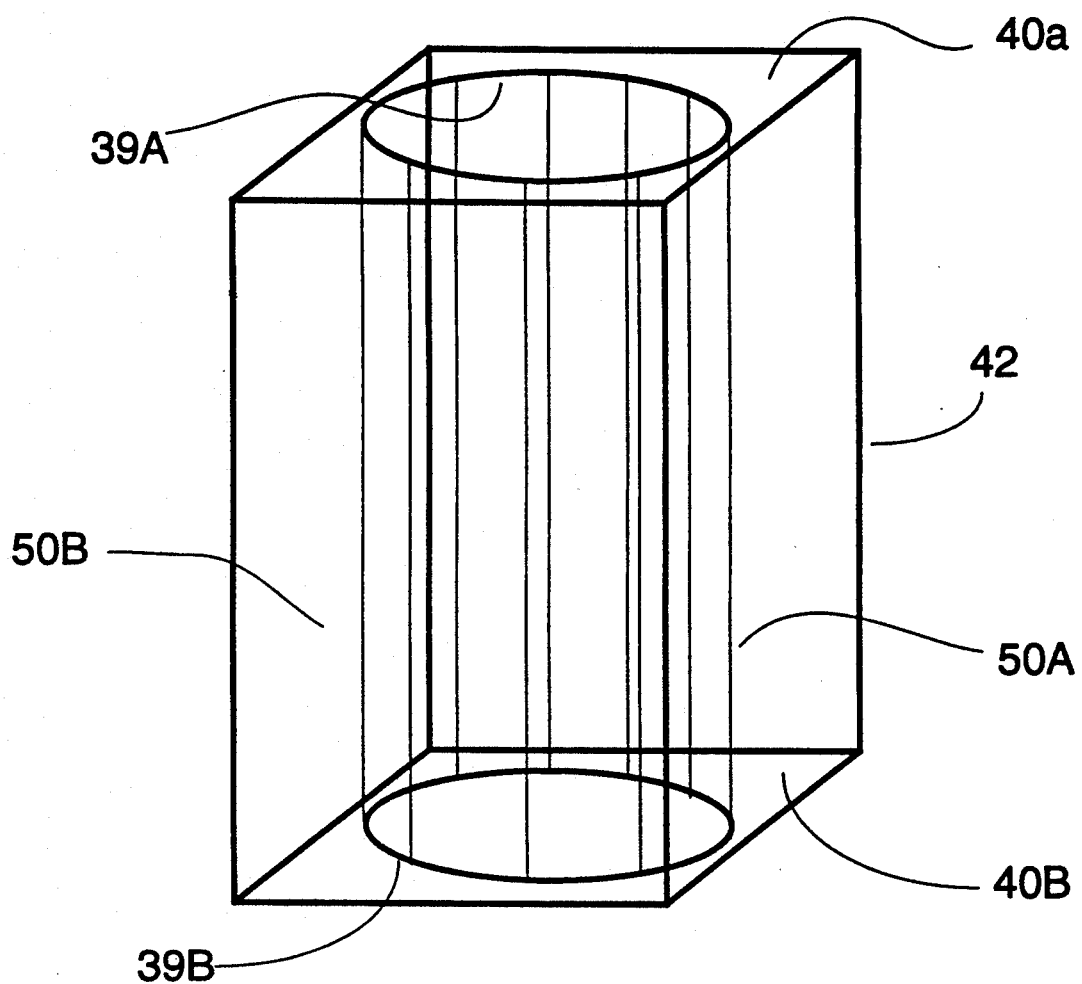
FIG. 4B is a perspective drawing of a open air giber pattern. The multiple fibers are strung in a cylinder formation.

FIG. 4B shows a perspective drawing of another implementation of a multiple fiber laser projection system. Horizontal panels 40A and 40B are indicated, with circular cut out 39A and 39B sections incorporated in the panel design. The vertical fibers indicated in FIG. 4B, such as 50A and 50B, are strung in the chamber to form a three dimensional cylinder structure. No vertical panels are indicated in this particular design.

Figure 4C:
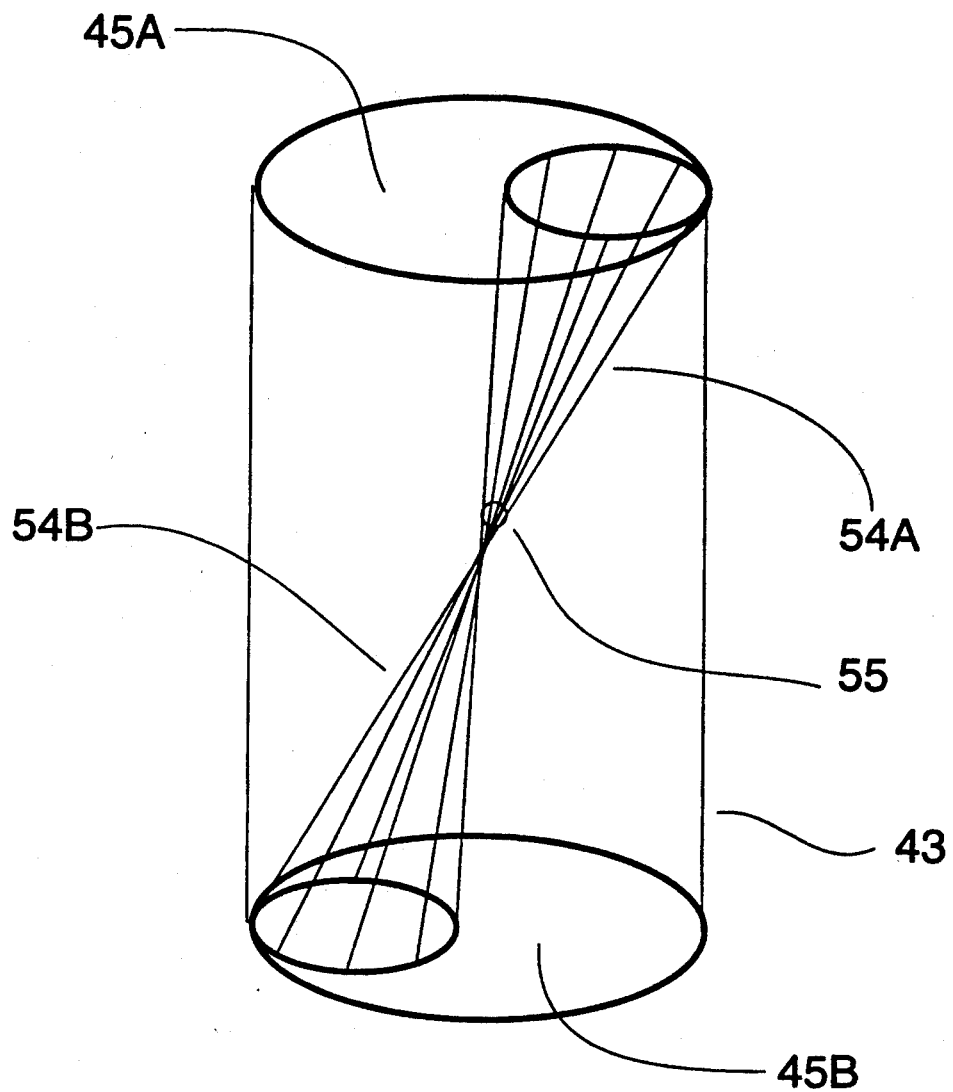
FIG. 4C is an oblique cone fiber pattern strung in a cylindrical enclosure. The cylinder structure is surrounded by a clear case.

FIG. 4C is a perspective drawing of a multiple fiber laser projection system strung in an oblique cone arrangement. In this particular implementation, circular horizontal panels 45A and 45B are employed, eliminating sharp 90 degree angled structure corners. A translucent crystal 55 is suspended in the top oblique cone formed by the cone case fibers indicated by 54A and 54B.

A circular clear case 43 supports the structure, and helps seal the inside contents of the projector from external elements such as dirt and dust. Such a fully enclosed chamber, such as the one shown in FIG. 4C, can be made to suspend particles capable of redirecting laser light photons. Such a scattering system might consist of a mixture of smoke and air, or a chemical dye in water. FIGS. 4A through 4C are just 3 of a infinite number of multiple fiber projector implementations.

Figure 5:
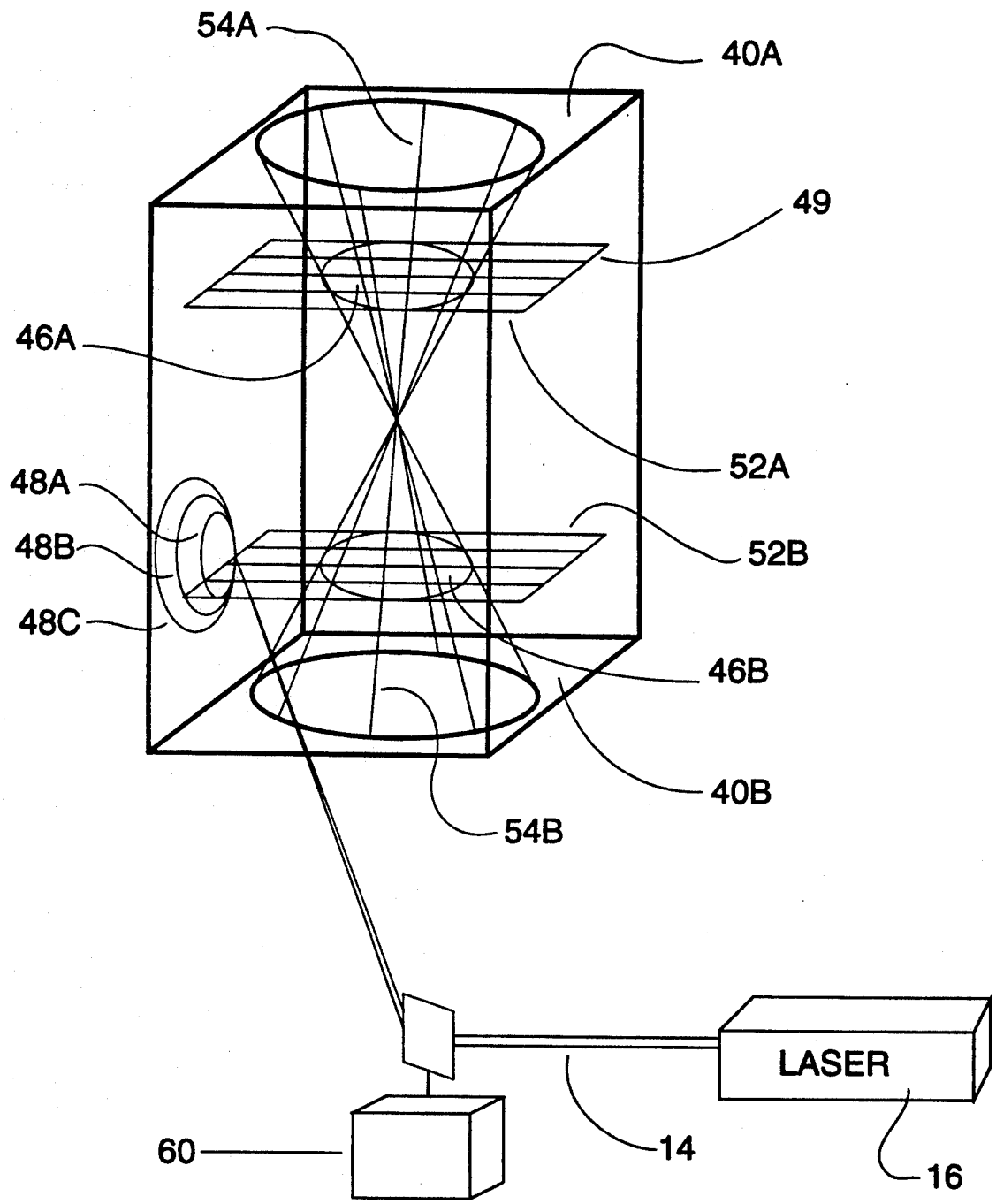
FIG. 5 is a right cone shaped fiber pattern strung in a three dimensional structure. Circular planes are suspended in the cone. A laser beam intersects 3 fibers, projecting 3 tangential circles.

FIG. 5 illustrates a perspective view of a multiple fiber laser projection system incorporating a number of supplemental items. Cone case fibers 54A and 54B are strung in a dual cone, hour glass arrangement. In addition to these angled cone case fibers, additional horizontal fibers 52A and 52B are strung through the hour glass fiber arrangement. A fiber-to-case lockdown means 49 is indicated, keeping horizontal fibers 52A and 52B taut. The tautly held horizontal fibers are capable of supporting circular suspended planes 46A and 46B. Such planes may be transparent, further adding to the aesthetic appeal of the multiple fiber laser light projector's design.

In FIG. 5, a laser beam 14 from a laser 16 is reflected off an electromechanical mirrored scanner 60. The mirrored scanner 60 redirects the incident laser beam 14 into the fiber hour glass arrangement. The laser is positioned in the same plane as the horizontal fiber plane in which fiber 52B resides.

The resulting intersection between the laser beam 14 and 3 of these horizontal fibers 52B is the creation of 3 tangential laser circles, 48A, 48B, and 48C. These circular laser patterns are solid, as these horizontal fibers 52B are reflective, not translucent. These solid circular patterns differ from the alternating light-to-dark laser light patterns characteristically given off a translucent fiber upon laser intersection.

The conic shaped multiple fiber system illustrated in FIG. 5 is largely an empty volume. The volume within the three dimensional structure is only sparsely populated with fibers. This sparse arrangement of fibers within the cone allows for viewing from any unobstructed angle. Transparent panels or surfaces may be placed around the multiple fiber to allow viewing from desireable orientations. Likewise, viewing thru the sparsely fiber populated structure can be prevented via the incorporation of nontransparent panels across desired planes or surfaces. The multiple fiber arrangement itself, however, shall only deviate the light path of a small percentage of light passing thru the actual volume within the support structure. Individual light photons not striking a fiber shall pass directly thru the sparsely populated volume in a transparent manner.

Although the description above contains many specificities, these should not be construed as limiting the scope of the invention but merely providing illustrations of some of the previously preferred embodiments of this invention. For example, the laser beam size could be enlarged or magnified through the use and positioning of optical lenses. The fibers could be covered with a cladding surface.

Multiple fiber support structures could take on an infinite number of geometric designs, while internal fiber patterns could likewise be strung in a multitude of patterns. External lasers to single or multiple fiber systems could approach said fibers from any number of different positions in space. Electromechanical scanners directing a laser beam into a fiber laser projection system could take on a variety of implementations.

Thus the scope of the invention should be determined by the appended claims and their legal equivalents, rather than by examples given.

What is claimed is:

1. A single fiber laser light projection system comprising:
   a) a bendable, cylindrically shaped fiber of a given cross-sectional area D, whose exterior surface is capable of generating specular reflections of incident laser light;
   b) support means for securing said fiber;
   c) a laser light beam;
   d) an intersection between said fiber and said laser beam such that the laser beam's diameter exceeds the fiber's diameter D at the point of intersection; and
   the angle of intersection between said laser beam and said fiber is be determined by the directional tangent ray of said fiber and the direction of said laser beam at the point of intersection; and
   the angle of intersection between said fiber and said laser beam is any angle value greater than zero degrees and less than or equal to ninety degrees; and
   such an intersection between said laser beam and said fiber redirects the individual laser light photons in a projection path forming a cone, with the directional tangent of said fiber at the point of intersection forming the vortex axis of the laser light cone, and the laser light being distributed along the perimeter of said cone.

2. The single fiber laser light projection system of claim 1 wherein the angle of intersection between said fiber and said laser beam occurs at 90 degrees, redirecting the individual laser light photons in a projection path forming a plane of laser light.

3. The single fiber laser light projection system of claim 1 wherein said fiber is translucent in nature, capable of both reflecting and refracting incident laser light.

4. The single fiber laser light projection system of claim 2 wherein said fiber is translucent in nature, capable of both reflecting and refracting incident laser light.

5. The single fiber laser light projection system of claim 1 wherein said fiber is positioned in space in a taut, linear manner.

6. The single fiber laser light projection system of claim 2 wherein said fiber is positioned in space in a taut, linear manner.

7. The single fiber laser light projection system of claim 5 wherein said fiber is translucent, capable of both reflecting and refracting incident laser light.

8. The single fiber laser light projection system of claim 6 wherein said fiber is translucent, capable of both reflecting and refracting incident laser light.

9. A multiple fiber laser light projection system comprising:
   a) a three dimensional support structure;
   b) a plurality of bendable, cylindrically shaped fiber sections, the exterior surface of said fiber sections being capable of generating specular reflections of incident laser light; and
   c) a means of securing said plurality of fiber sections to said support structure; and
   d) said fibers being secured in a sparse arrangement within the three dimensional structure, allowing for transparent viewing thru the plurality of fibers.

10. The multiple fiber laser light projection system of claim 9 wherein said fibers are secured to said support structure in a taut, linear manner.

11. The multiple fiber laser light projection system of claim 10 wherein a plurality of said fibers form the outline of a three dimensional geometric structure, with each point on each fiber section capable of being described in space through a mathematical equation relative to a point of origin locatable within said structure.

12. The multiple fiber laser light projection system of claim 11 wherein said fiber sections are oriented within said support structure to form an hour glass shaped cone pair arrangement.

13. The multiple fiber laser light projection system of claim 9 wherein said fiber sections is translucent in nature, capable of both reflecting and refracting incident laser light.

14. The multiple fiber laser light projection system of claim 9, further including at least 1 flat panel surface attached across a face of the support structure.

15. The multiple fiber laser light projection system of claim 9 wherein said support structure contains panels on each exterior side, with at least 1 panel being clear to allow for laser light transmission into the system.

16. The multiple fiber laser light projection system of claim 11, further including at least one multifaceted crystal supported within said fiber section pattern.

17. The multiple fiber laser light projection system of claim 11, further including at least one flat geometric panel, capable of generating specular reflections of incident laser light, and supported within the fiber sections.

18. The multiple fiber laser light projection system of claim 11, further a including a laser light scattering composition comprising:
   a) any clear medium for transmission of laser light; and
   b) a chemical additive to be mixed with said clear medium to create an environment of suspended particles, said particles being conducive to the scattering of laser light photons.

19. The multiple fiber laser light projection system of claim 11, further including a laser beam directed into said projection system, the diameter of said laser beam being greater than the cross-sectional diameter of all reflective fibers upon laser beam entry within said projection system.

20. The multiple fiber laser light projection system of claim 19, further including an electromechanical scanner, said scanner containing a mirror, said scanner being capable of changing its mirror's position with time through the use of internal or external controlling electrical hardware.

* * * * *